United States Patent
Bai et al.

(10) Patent No.: US 11,204,779 B2
(45) Date of Patent: Dec. 21, 2021

(54) TERMINAL CONTROL METHOD AND APPARATUS, TERMINAL AND STORAGE MEDIUM

(71) Applicant: Beijing Xiaomi Mobile Software Co., Ltd., Beijing (CN)

(72) Inventors: Dongshu Bai, Beijing (CN); Jiajia Zhuang, Beijing (CN); Rong Liu, Beijing (CN); Qing Zheng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/826,068

(22) Filed: Mar. 20, 2020

(65) Prior Publication Data
US 2021/0173664 A1    Jun. 10, 2021

(30) Foreign Application Priority Data
Dec. 5, 2019    (CN) .......................... 201911234423.9

(51) Int. Cl.
*G06F 1/00*     (2006.01)
*G06F 9/445*    (2018.01)
*G06F 1/3203*   (2019.01)
*G06F 1/26*     (2006.01)

(52) U.S. Cl.
CPC ............ *G06F 9/445* (2013.01); *G06F 1/3203* (2013.01); *G06F 1/26* (2013.01)

(58) Field of Classification Search
CPC ................................ G06F 9/445; G06F 1/3203

USPC .......................................................... 713/300
See application file for complete search history.

(56) References Cited

U.S. PATENT DOCUMENTS

| | | | |
|---|---|---|---|
| 9,699,301 B1 * | 7/2017 | Siritzky | H04M 1/72445 |
| 9,749,470 B1 * | 8/2017 | Lockenour | H04W 4/48 |
| 9,854,086 B1 * | 12/2017 | McSchooler | H04W 4/029 |
| 9,888,392 B1 * | 2/2018 | Snyder | H04W 4/44 |
| 10,282,561 B2 * | 5/2019 | Qiu | G06F 21/566 |
| 10,384,602 B1 * | 8/2019 | Csabi | B60Q 9/008 |
| 10,558,328 B2 * | 2/2020 | Huang | G06F 3/0482 |
| 2008/0318562 A1 * | 12/2008 | Featherstone | H04M 1/72454 455/418 |

(Continued)

FOREIGN PATENT DOCUMENTS

| | | |
|---|---|---|
| CN | 106971118 A | 7/2017 |
| CN | 107766103 A | 3/2018 |

(Continued)

OTHER PUBLICATIONS

First Office Action of Chinese Application No. 201911234423.9 dated Oct. 10, 2020.

(Continued)

*Primary Examiner* — Volvick Derose
(74) *Attorney, Agent, or Firm* — Finnegan, Henderson, Farabow, Garrett & Dunner, L.L.P.

(57) ABSTRACT

A terminal control method includes: receiving a focus mode starting instruction; entering a focus mode according to the focus mode starting instruction; performing, in response to an application-invoking request received within a duration of the focus mode, process control on an application being invoked; and exiting the focus mode when the duration of the focus mode ends.

20 Claims, 12 Drawing Sheets

(56) References Cited

U.S. PATENT DOCUMENTS

| | | | | |
|---|---|---|---|---|
| 2014/0184165 | A1* | 7/2014 | Takahashi | H01M 10/48 320/134 |
| 2014/0316290 | A1* | 10/2014 | Kobayashi | A61B 5/02141 600/490 |
| 2016/0044575 | A1* | 2/2016 | Rajeevalochana | H04W 4/027 455/410 |
| 2016/0151007 | A1* | 6/2016 | Tateda | A61B 5/02416 600/476 |
| 2019/0088351 | A1* | 3/2019 | Takarada | G16H 10/65 |
| 2019/0271744 | A1* | 9/2019 | Huang | G06Q 30/0201 |
| 2019/0342447 | A1* | 11/2019 | Ko | H04M 1/72457 |
| 2020/0356687 | A1* | 11/2020 | Salzman | H04L 63/104 |

FOREIGN PATENT DOCUMENTS

| | | |
|---|---|---|
| CN | 108549798 A | 9/2018 |
| CN | 108833690 A | 11/2018 |
| CN | 109657453 A | 4/2019 |
| CN | 110244888 A | 9/2019 |
| WO | WO 2017162052 A1 | 9/2017 |

OTHER PUBLICATIONS

Extended European Search Report of counterpart EP Application No. 20171574.5 dated Nov. 18, 2020.
Second Office Action dated May 28, 2021, from The State Intellectual Property Office of People's Republic of China in counterpart Chinese Application No. 201911234423.9.

\* cited by examiner

TERMINAL CONTROL METHOD AND APPARATUS, TERMINAL AND STORAGE MEDIUM

CROSS-REFERENCE TO RELATED APPLICATION

This application is based upon and claims priority to Chinese Patent Application No. 201911234423.9, filed on Dec. 5, 2019, the entire content of which is incorporated herein by reference.

TECHNICAL FIELD

The present disclosure relates to the field of computer technologies, and more particularly, to a terminal control method and apparatus, a terminal and a storage medium.

BACKGROUND

With the enrichment in functions of terminals, users rely heavily on the terminals and tend to spend a large amount of spare time on using them for entertainment. In addition, a terminal is easy to take along with and also convenient in providing different functions, which may make a user who is doing a certain task be distracted by the terminal. As such, to work, study, or do other activities efficiently, the user may have to switch off the terminal so that the user may avoid being disturbed by the terminal.

SUMMARY

According to a first aspect of embodiments of the present disclosure, a terminal control method includes: receiving a focus mode starting instruction; entering a focus mode according to the focus mode starting instruction; performing, in response to an application-invoking request received within a duration of the focus mode, process control on an application being invoked, wherein the process control is configured to determine whether to execute the application being invoked in a foreground; and exiting the focus mode when the duration of the focus mode ends.

According to a second aspect of embodiments of the present disclosure, an apparatus includes: a processor; and a memory configured to store instructions executable by the processor, wherein the processor is configured to: receive a focus mode starting instruction; enter a focus mode according to the focus mode starting instruction; perform, in response to an application-invoking request received within a duration of the focus mode, process control on an application being invoked, wherein the process control is configured to determine whether to execute the application being invoked in a foreground; and exit the focus mode when the duration of the focus mode ends.

According to a third aspect of embodiments of the present disclosure, a non-transitory computer-readable storage medium has stored therein instructions that, when executed by a processor of a terminal, cause the terminal to perform the terminal control method according to the first aspect.

The technical solutions provided by the embodiments of the present disclosure may include at least the following benefits.

In the embodiments of the present disclosure, a terminal is provided with a focus mode, and the terminal enters the focus mode in response to a focus mode starting instruction. Within the duration of the focus mode, when an application-invoking request is received, the terminal will determine whether to execute the application in the foreground. As such, the user can only operate a preset application that is allowed to be executed in the foreground, therefore, only a limited access to the terminal is provided for the user in the focus mode, which helps to reduce the frequency of the user using the terminal within the duration of the focus mode.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same number in different drawings represents the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Embodiments of the present disclosure provide terminal control methods, which may be used for terminals having an interface display function. The terminals may be a smart phone, a tablet computer, an e-book reader, a personal portable computer, or the like. With the terminal control methods provided in the embodiments of the present disclosure, a user can turn on a focus mode of a terminal during a time period of studying, working, and the like, in which the efficiency is needed to be improved, thereby avoiding a distraction from the terminal.

Figure 1:
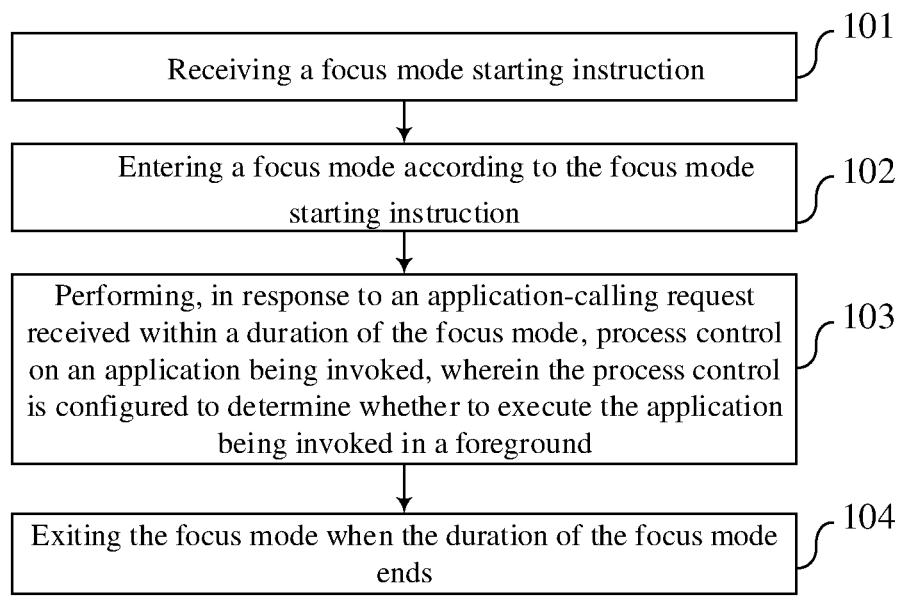
FIG. 1 is a flowchart illustrating a terminal control method according to an embodiment of the present disclosure.

FIG. 1 is a flowchart illustrating a terminal control method according to an embodiment of the present disclosure. The terminal control method may be applied to a terminal having an interface display function. As illustrated in FIG. 1, the method includes the following steps.

In step 101, a focus mode starting instruction is received.

In an embodiment, the focus mode may be a system function (similar to a silent mode, a sleep mode, a conference mode, or the like) provided by an operating system of a terminal, or may be an application function provided by an application in the terminal.

In an embodiment, a user turns on a terminal screen and starts an application providing the focus mode. A focus mode starting interface is displayed on the terminal. By clicking a control in the starting interface, the user can trigger the focus mode starting instruction.

In an embodiment, the terminal is provided with a shortcut key to the focus mode. The user may trigger the shortcut key when the terminal screen is turned off, so that the terminal receives the focus mode starting instruction. The focus mode starting instruction may include a default duration (for example, 60 minutes) of the focus mode.

In an embodiment, the user may send the focus mode starting instruction to the terminal through a voice input.

Figure 2:
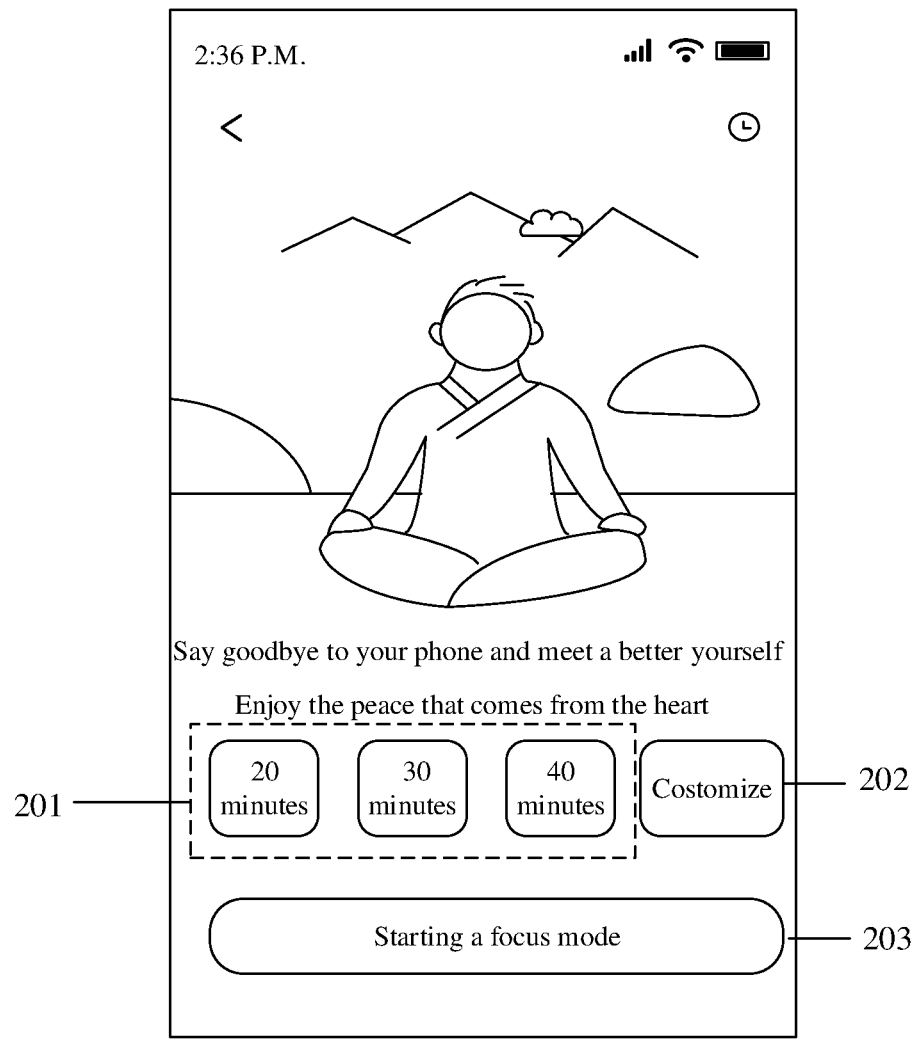
FIG. 2 is a schematic diagram illustrating a focus mode starting interface according to an embodiment of the present disclosure.

FIG. 2 is a schematic diagram illustrates a focus mode starting interface according to an embodiment. The user may select a duration of the focus mode by clicking a duration selection control 201, or customize a duration of the focus mode with a custom control 202. Then, after a "starting a focus mode" control 203 is clicked, the focus mode starting instruction is triggered.

In an embodiment, a duration selection slider is displayed in the focus mode starting interface. The user slides the slider to select a duration of the focus mode, or clicks buttons such as "+" and "−" to adjust the duration of the focus mode, which is not limited in this embodiment.

Referring back to FIG. 1, in step 102, the focus mode is entered according to the focus mode starting instruction.

In an embodiment, the terminal, after receiving the focus mode starting instruction, controls the foreground to display a focus mode interface. The focus mode interface will be displayed by the terminal within the duration of the focus mode, and the user may not actively turn off the focus mode interface. The focus mode interface is an interface displayed when the screen is turned on within the duration of the focus mode.

In an embodiment, when the terminal screen is turned off, the user may trigger a shortcut key to the focus mode to enable the terminal to enter the focus mode. In this process, the terminal screen is turned off, and thus the focus mode interface is not displayed.

Figure 3:
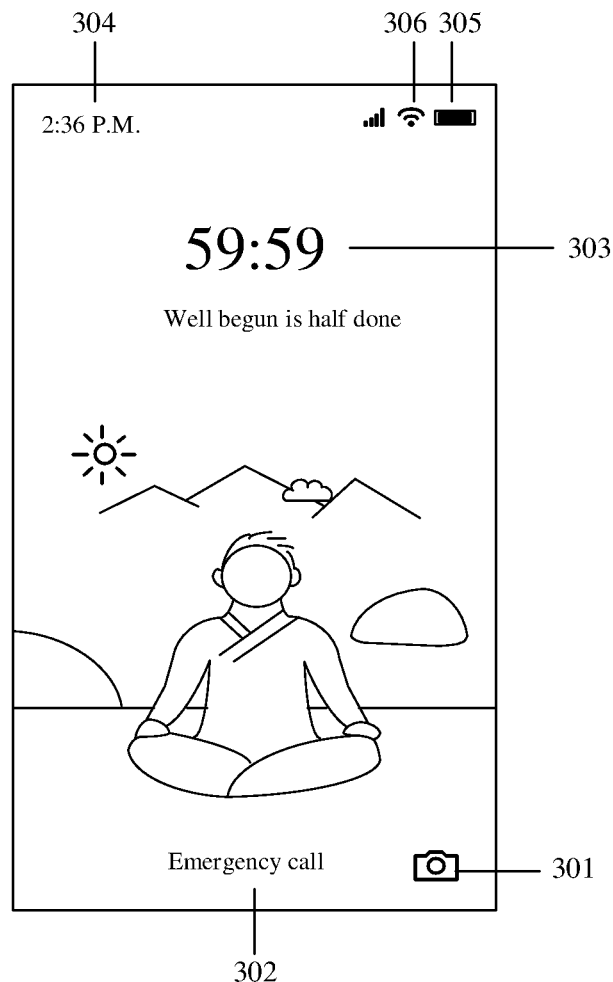
FIG. 3 is a schematic diagram illustrating a focus mode interface according to an embodiment of the present disclosure.

FIG. 3 is a schematic diagram illustrating a focus mode interface according to an embodiment. The focus mode interface includes a remaining time length 303 of the focus mode, a current time 304, a remaining capacity 305 of the terminal, a signal state 306 of the terminal, and the like. The terminal may also display a camera application icon 301 and a virtual button application icon 302 for emergency call on the lower side of the focus mode interface.

Referring back to FIG. 1, in step 103, in response to an application-invoking request received within a duration of the focus mode, process control is performed on an application being invoked, wherein the process control is configured to determine whether to execute the application being invoked in a foreground.

Within the duration of the focus mode, in order to prevent the user from being interrupted by an application of the terminal, the terminal does not directly execute the application when receiving the application-invoking request, but first performs process control on the application being invoked to determine whether the application should be executed.

In an embodiment, the application-invoking request includes an invoking request triggered by an application, or an application-invoking request generated by a user who triggers the application.

In an embodiment, within the duration of the focus mode, when receiving an incoming call notification, the terminal performs process control on the incoming call notification to determine that the incoming call notification should be executed in the foreground, and then an incoming call interface is displayed in the terminal; otherwise, when receiving a promotion message from an entertainment application, the terminal performs process control on the promotion message to determine that the promotion message should not be executed in the foreground. Then, this promotion message will not be displayed in the terminal but is stored in a message list.

In step 104, when the duration of the focus mode ends, the focus mode is exited.

When the terminal detects that the focus mode has lasted for a preset time length, the terminal exits the focus mode. In an embodiment, when the terminal screen is turned on, the foreground is controlled to stop displaying the focus mode interface and return to a previous terminal interface shown before the focus mode is entered. After the terminal returns to the previous terminal interface, a message list is displayed, in which information such as message notifications blocked by the terminal through the process control within the duration of the focus mode is stored.

In the embodiments of the present disclosure, a terminal is provided with a focus mode, and the terminal enters the focus mode in response to a focus mode starting instruction. Within the duration of the focus mode, when an application-invoking request is received, the terminal determines whether to execute the application in the foreground. As such, the user can only operate a preset application that is allowed to be executed in the foreground, therefore, only a limited access to the terminal is provided for the user in the focus mode, which helps to reduce the frequency of the user using the terminal within the duration of the focus mode.

Figure 4:
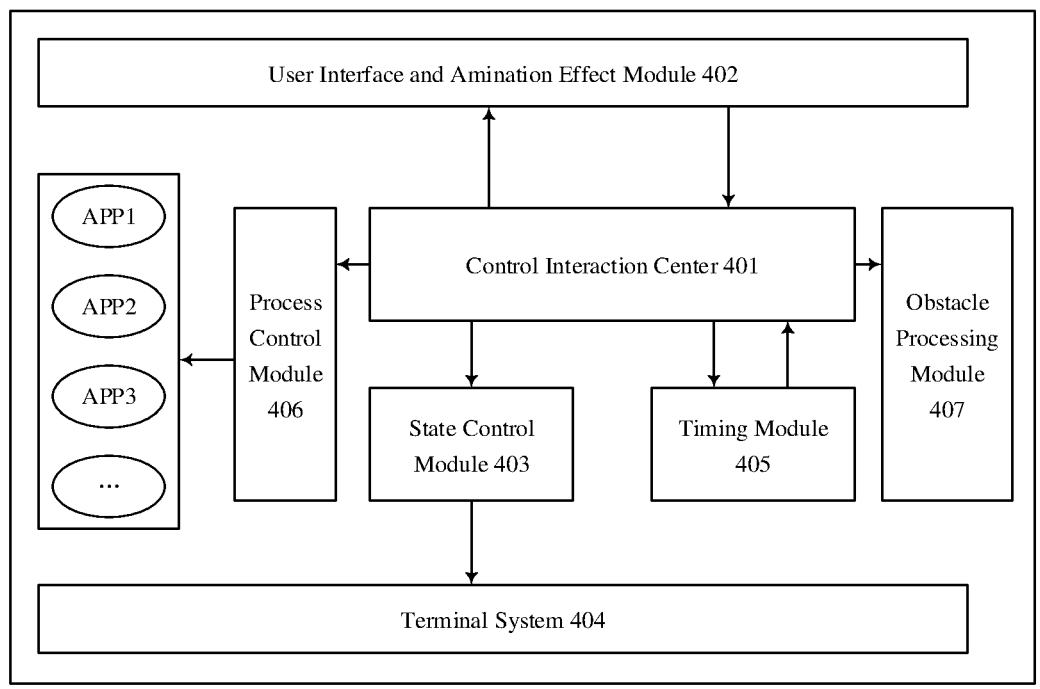
FIG. 4 is a schematic diagram illustrating a terminal control method according to an embodiment of the present disclosure.

FIG. 4 is a schematic diagram illustrating a terminal control method according to an embodiment. When receiving a focus mode starting instruction triggered by a user interface (UI) and animation effect module 402, a control interaction center 401 controls a terminal system 404 to enter the focus mode through a state control module 403 and triggers a timing module 405 to start timing. Within the duration of the focus mode, when receiving an application-invoking request from the UI and the animation effect module 402, the control interaction center 401 determines, through a process control module 406, whether to execute the application in the foreground. In the case that an abnormal situation is detected, the control interaction center 401 performs abnormality processing through an obstacle processing module 407. In the case that the passed time of the timing module 405 reaches the duration of the focus mode, the control interaction center 401 is notified. The control interaction center 401 then notifies the terminal system 404 to exit the focus mode through the state control module 403, and the normal use of the terminal is restored.

Figure 5:
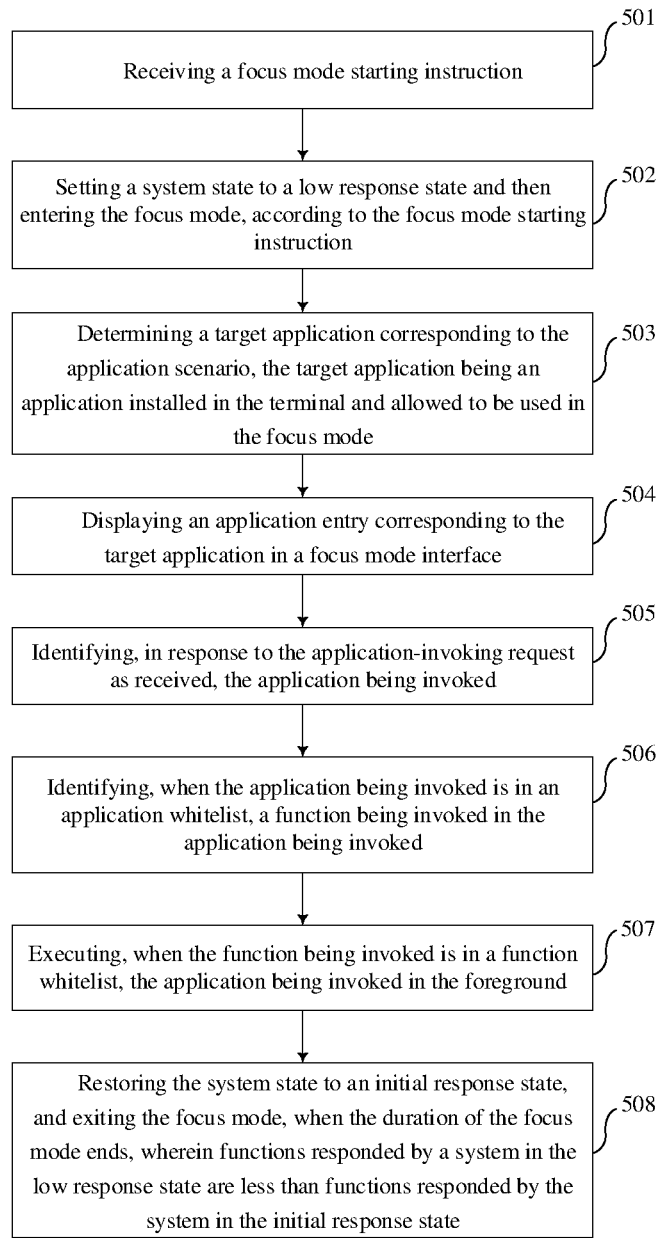
FIG. 5 is a flowchart illustrating a terminal control method according to an embodiment of the present disclosure.

FIG. 5 is a flowchart illustrating a terminal control method according to an embodiment of the present disclosure. The terminal control method may be applied to a terminal having an interface display function. The method includes the following steps.

In step 501, a focus mode starting instruction is received, and the focus mode starting instruction includes an application scenario corresponding to the focus mode. Step 501 is similar to step 101 (FIG. 1).

In an embodiment, a user selects an application scenario (such as a driving scenario, a learning scenario, or the like) and a duration of the focus mode in a focus mode starting interface, and clicks a focus mode starting control to trigger the focus mode starting instruction.

In step 502, according to the focus mode starting instruction, a system state is set to a low response state and the focus mode is then entered, wherein functions responded to by the system in the low response state are less than functions responded to by the system in an initial response state.

In an embodiment, according to the received focus mode starting instruction, through the state control module, the control interaction center of the terminal sets the terminal system to the low response state and enters the focus mode. In the low response state, the system turns off responses to some functions, thereby preventing a user from entering the system or starting applications through another way. In an embodiment, the system turns off the response to at least one of the following functions: a click function for virtual buttons and/or physical buttons (such as turning off the response to a click on a virtual), a touch function for auxiliary controls (such as closing a floating ball control to prevent the user from using certain functions of the system through the floating ball control), a quick gesture function (such as turning off a response to quick gestures to prevent the user from entering the system or starting applications through the quick gestures), and a voice control function (such as turning off a voice recognition function to prevent the user from starting applications or entering the system through voice control). After the terminal enters the focus mode, a focus mode interface is displayed.

In step 503, a target application corresponding to each application scenario is determined. The target application is an application allowed to be used in the focus mode, and also an application installed in the terminal.

When the terminal is still within the duration of the focus mode, if the system turns off the response to all applications and functions, it may cause the user unable to use the terminal in an emergent or special situation, thereby influencing the normal needs of the user. For example, after a focus mode is set by a user, when there is an emergency and a call needs to be made, if the terminal system turns off a response to a call request, unnecessary trouble may be caused to the user under this circumstance.

In an embodiment, application(s) which are allowed to be used in the focus mode are preset as target application(s) in the terminal, and the terminal system, after entering the low response state, will block other applications and functions except the target application(s). For example, after entering the focus mode, a terminal may allow the user to use an emergency call function and a camera function.

In an embodiment, the focus mode starting instruction includes an application scenario corresponding to the focus mode, and the terminal determines the target application according to different application scenarios. For example, the target application may include a navigation application when the application scenario is a driving scenario; the target application may include a learning application when the application scenario is a learning scenario; and the target application may include a music application when the application scenario is a rest scenario.

In an embodiment, the user may trigger a control for turning on the focus mode, and then the terminal interface displays a selection list of application scenarios. When the user selects the driving scenario, the terminal determines that the target applications are an emergency call, a camera, and a navigation application; and after entering the focus mode, the terminal may remind the user to turn on the navigation application in advance, thereby avoiding the need to operate the terminal during driving.

It should be noted that the foregoing application scenarios and their corresponding target applications are only examples. In an embodiment, developers may also set corresponding target applications according to other application scenarios, which is not limited in this embodiment.

In step 504, an application entry corresponding to the target application is displayed in the focus mode interface.

In an embodiment, the control interaction center determines a target application of the current application scenario, and controls the UI and the animation effect module to display the application entry of the target application when the focus mode interface is displayed in the foreground.

In an embodiment, the terminal displays an application icon of the target application at a preset position on the focus mode interface.

In an embodiment, the terminal displays a target application list button at a preset position on the focus mode interface, and the user may trigger the target application list button so as to cause the terminal to display a target application list on the top of the focus mode interface in an overlapping manner.

In an embodiment, the terminal includes an application icon of the target application in a hidden interface of the focus mode interface. By sliding the focus mode interface, the user causes the terminal to switch to the hidden interface and to display the application icon of the target application.

As illustrated in FIG. 3, the terminal displays a camera application icon 301 and a virtual button application icon 302 for emergency call on the lower side of the focus mode interface.

In step 505, within the duration of the focus mode, when an application-invoking request is received, the application being invoked is identified.

In an embodiment, the application being invoked is identified by the control interaction center in response to the application-invoking request as received.

In an embodiment, the application-invoking request includes an application-invoking request generated by a user triggering a target application through the focus mode interface, and further includes an application-invoking request when an application installed in the terminal generates a notification message.

In an embodiment, when it comes to a preset alarm time, the alarm clock application sends an application-invoking request to the control interaction center. The control interaction center receives this application-invoking request, and identifies that the application which sends the application-invoking request is an alarm clock application.

In step 506, when the application being invoked is in an application whitelist, then a function being invoked in the application being invoked is further identified.

In an embodiment, an application whitelist is set in the terminal in advance, and a list of whitelist applications is stored in the whitelist, wherein whitelist applications are applications that are allowed to be executed in the foreground within the duration of the state control.

Since the whitelist applications may have entertaining functions, not all the functions in the whitelist applications may be executed, thus, the function being invoked is checked in the application being invoked. The control interaction center, after identifying the application being invoked, determines whether the application being invoked is in the application whitelist through a process control module, and further identifies the function being invoked in the application being invoked when the application being invoked is in the application whitelist.

When the application being invoked is not in the application whitelist, the application is not allowed to be executed in the foreground. In an embodiment, when the application-invoking request includes a notification message in the application being invoked, the notification message is stored in a terminal message list.

In an embodiment, the alarm clock application sends an application-invoking request to the control interaction center. The control interaction center receives the application-invoking request, identifies through the process control module that the application sending the application-invoking request is an alarm clock, and identifies that a function being invoked of the alarm clock is an alarm reminder.

In step 507, when the function being invoked is in the function whitelist, the application being invoked is executed in the foreground.

In an embodiment, a function whitelist is set in the terminal, and a part of functions being applied to an application in the application whitelist are stored in the function whitelist, wherein the part of functions are functions that are allowed to be executed by the foreground within the duration of the focus mode. The process control module, after identifying the function being invoked in the application being invoked, determines whether the function being invoked is in the function whitelist, and executes the application being invoked in the foreground when the function being invoked is in the function whitelist.

In an embodiment, the function whitelist may include a photographing function for a camera application, an emergency call function and a call answer function, a voice answer function for communication applications, and a schedule reminder and alarm bell function. In a driving scenario, the function whitelist may further include a navigation function for navigation applications. In a learning scenario, the function whitelist may further include a learning function for learning applications. In a rest scenario, the function whitelist may further include a music play function for music applications.

In an embodiment, the process control module identifies the function being invoked in an alarm clock as an alarm reminder function, which is in the function whitelist, and then controls to enable the alarm reminder function in the foreground.

In an embodiment, when the control interaction center receives an abnormal invoking request for tasks such as restarting or shutting down the terminal, the obstacle processing module controls the terminal to continue maintaining the focus mode when the terminal is turned on again. The timing module is still timing during terminal shutdown.

When the terminal is turned on again, the remaining time of the focus mode is obtained by subtracting the duration that the terminal is turned off from the remaining time of the focus mode at the moment that the terminal is turned off. When the process control module determines that a function being invoked in the application being invoked is not in the function whitelist, the terminal display state is kept unchanged (i.e., maintaining the screen to be turned off or continuing displaying the focus mode interface), and stores an invoking request of the application being invoked into the terminal message list.

In an embodiment, the user triggers an application entry of the camera application of the focus mode interface. The terminal receives an invoking request for a photographing function of the camera application and determines that the photographing function belongs to the function whitelist, and the photographing function of the camera is then enabled in the foreground. When the user clicks an album button in a camera interface, the terminal receives an invoking request for the album function, determines that the album function does not belong to the function whitelist, and controls the foreground to display the focus mode interface.

In step 508, when the duration of the focus mode ends, the system state is restored to the initial response state, and the focus mode is exited.

When the time length of the timing module reaches a preset time length of the focus mode, the control interaction center restores the system state of the terminal system to the initial response state through the status control module, and exits the focus mode. The UI and the animation effect module are used to restore the foreground to display an interface prior to the focus mode being entered.

In an embodiment, in order to improve the fun of the focus mode and enhance the user's sense of achievement, the control interaction center controls the foreground to display a focus mode sharing page when the system exits the focus mode.

Figure 6:
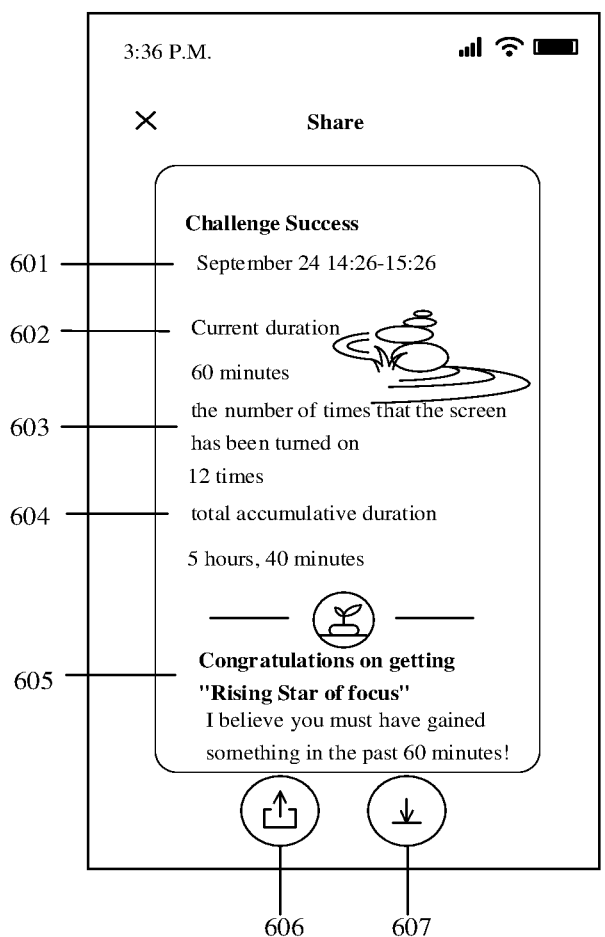
FIG. 6 is a schematic diagram illustrating a sharing interface of a focus mode according to an embodiment of the present disclosure.

FIG. 6 is a schematic diagram illustrating a sharing interface of a focus mode according to an embodiment. Referring to FIG. 6, after the focus mode ends, the terminal automatically displays the focus mode sharing page. The focus mode sharing page may include a start time and end time 601, a duration 602 of this focus mode, a number of times 603 that the screen is turned on within the duration of the focus mode, a total accumulative duration 604 of all the historical focus mode, a comment 605, and the like. The user can share this page by clicking a sharing control 606, or download this page by clicking a download control 607.

Figure 7:
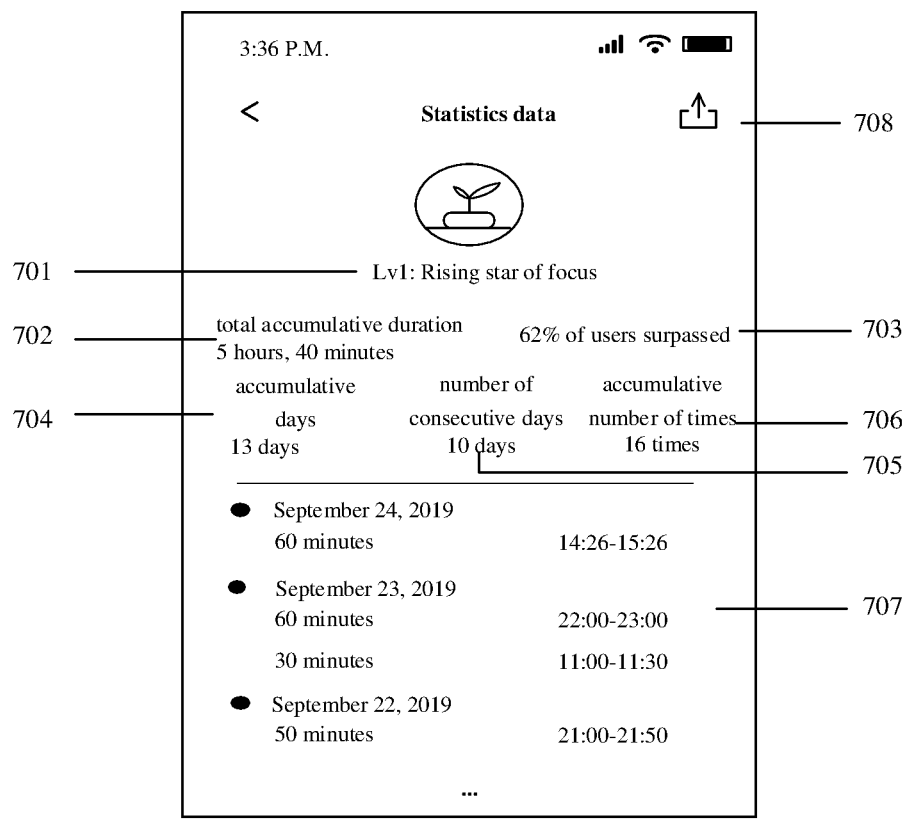
FIG. 7 is a schematic diagram illustrating a data statistics interface of a focus mode according to an embodiment of the present disclosure.
Figure 8:
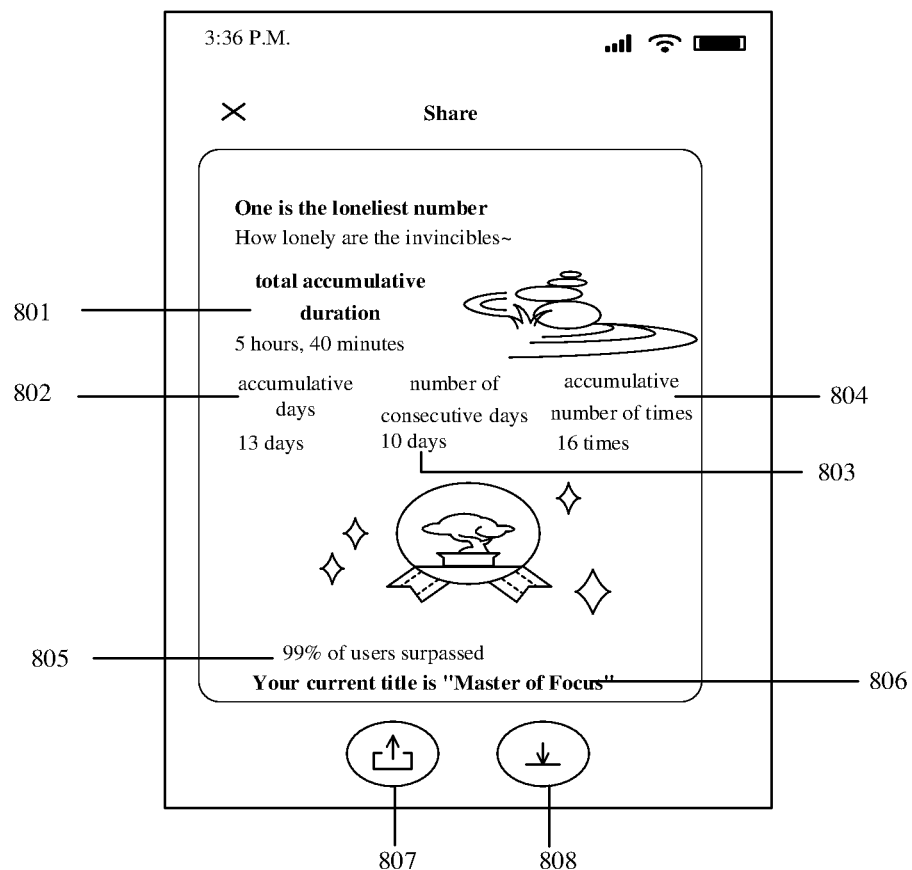
FIG. 8 is a schematic diagram illustrating a historical data sharing interface of the focus mode according to an embodiment of the present disclosure.

In an embodiment, when the system exits the focus mode, the user can choose to view the focus mode sharing page, a data statistics page, and a historical data sharing page. FIG. 7 illustrates a data statistics page according to an embodiment. The data statistics page may contain a current focus mode level 701, a total accumulative duration 702, the number of users one has surpassed 703, an accumulative number of days 704, a number of consecutive days 705, an accumulative number of times 706, a historical duration 707 of using the focus mode, and the like. The user can share the data statistics page by clicking a sharing control 708. FIG. 8 illustrates a historical data sharing page according to an embodiment. The historical data sharing page may contain a total accumulative duration 801, an accumulative number of days 802, a number of consecutive days 803, an accumulative number of times 804, a number of extra users 805 within an accumulative duration, an accumulative number of titles 806 of the focus mode, and the like in the case that the user uses the focus mode. The user can share this page by clicking a share control 807, or download this page by clicking a download control 808.

In an embodiment, when the system exits the focus mode, the terminal automatically displays a terminal message list in the foreground to remind the user to timely view and process the message notifications generated by applications within the duration of the focus mode.

By setting the application whitelist and the function whitelist, the terminal applications can be reasonably executed, thereby reducing the available functions of the terminal. This makes the user focus on work and leave the terminal, while ensures that the user can still use basic functions of the terminal in an emergent situation. The application whitelist and the function whitelist can be adjusted according to specific use scenarios correspondingly, which improves the flexibility of the focus mode. In addition, when the system exits the focus mode, the user is provided with a sharing interface and historical data, which improves user experience.

Figure 9:
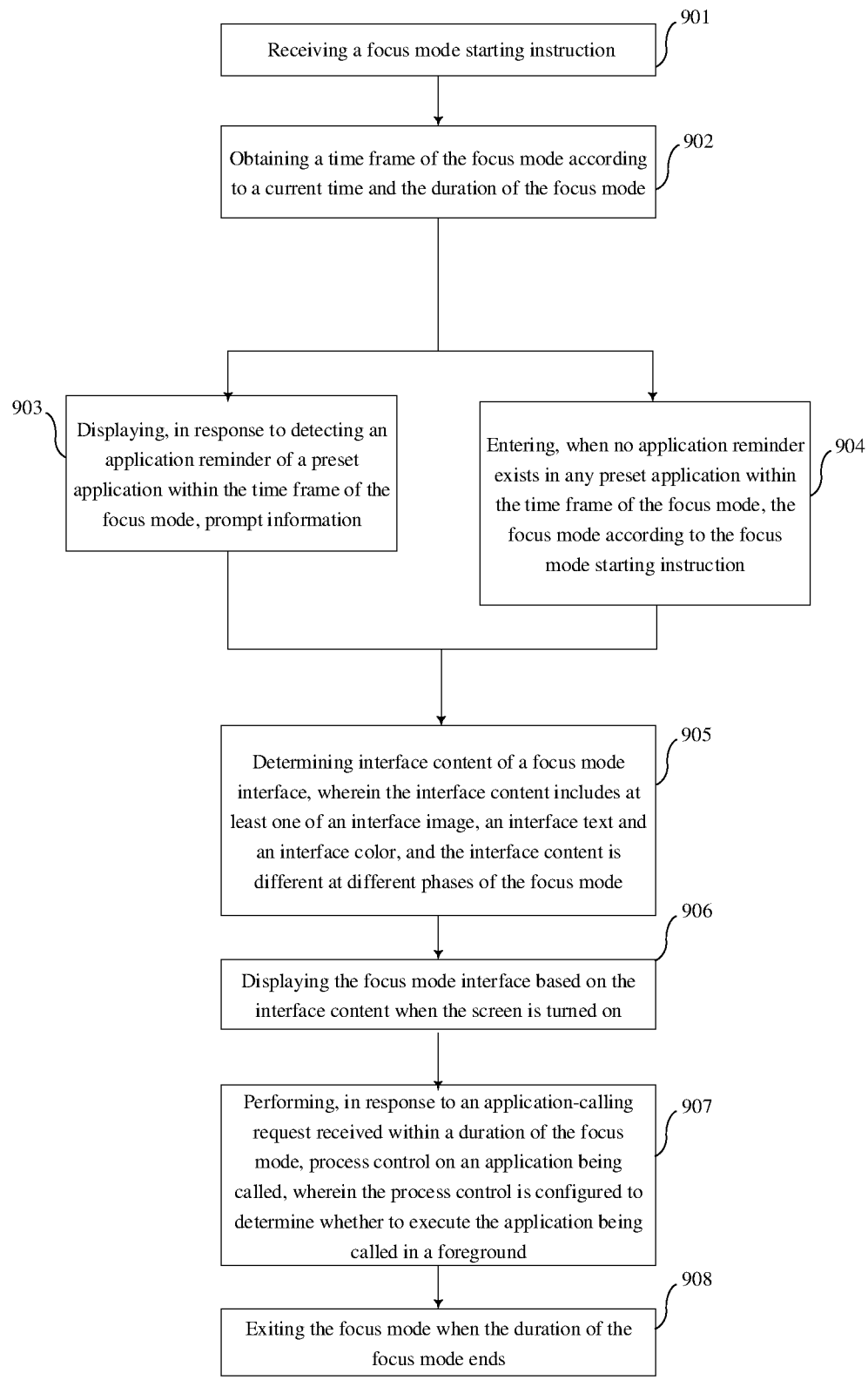
FIG. 9 is a flowchart illustrating a terminal control method according to an embodiment of the present disclosure.

FIG. 9 is a flowchart illustrating a terminal control method according to an embodiment of the present disclosure. This terminal control method may be applied to a terminal having an interface display function. The method includes the following steps.

In step 901, a focus mode starting instruction is received, similar to step 101 (FIG. 1).

In step 902, a time frame of the focus mode is obtained according to a current time and the duration of the focus mode.

When the terminal receives the focus mode starting instruction, the timing module acquires the current time and the duration of the focus mode in the focus mode starting instruction, and thus obtains the time frame of the focus mode and starts timing.

In an embodiment, the user may send a focus mode starting instruction at 10:00:00 and requires that it lasts for 30 minutes. Then, the time frame of the focus mode will be 10:00:00 to 10:30:00.

In step 903, when a preset application has an application reminder within the time frame of the focus mode, prompt information is displayed.

Most applications and functions may be blocked after the focus mode is started in the terminal. When the user sets an application reminder within the duration of the focus mode in advance, the user may miss this reminder (or cannot process this reminder in time through the terminal), thereby causing unnecessary troubles.

In an embodiment, the timing module obtains the time frame of the focus mode. The terminal detects whether an application reminder exists in preset applications within this period, and if such application reminder exists, the terminal will remind the user of the corresponding application reminder and ask the user to confirm whether the focus mode would be turned on. Here, the preset applications include an alarm clock, a calendar, shopping applications, and the like. The user can change the preset applications as required.

In an embodiment, the user may have set an alarm reminder of 10:15:00 in advance. When the user triggers, at 10:00:00, a focus mode starting instruction that will last for 30 minutes, the terminal then detects the alarm reminder of 10:15:00, and reminds the user of this alarm reminder to asks the user whether to enter the focus mode again.

In an embodiment, the user may have set a group-buying reminder for a certain product in a shopping application in advance. The opening time for group-buying of this product is 11:30:00, and the user triggers, at 10:00:00, a focus mode starting instruction that will last for 2 hours. Then, the terminal detects that this shopping application will send a message notification of a group-buying opening reminder at 11:30:00, therefore, the terminal reminds the user of the existence of the message notification of 11:30:00 in this shopping application, and asks the user to decide whether to enter the focus mode again.

In step 904, when no application reminder exists in the preset applications within the duration of the focus mode, the focus mode is entered according to the focus mode starting instruction, and a focus mode interface is displayed in the foreground.

When the terminal detects that no application reminder exists within the duration of the focus mode, it will directly enter the focus mode without acquiring a second confirmation from the user, and then the focus mode interface is displayed in the foreground.

In step 905, the interface content of the focus mode interface is determined. The interface content includes at least one of an interface image, an interface text, and an interface color, and the interface content is different in different phases of the focus mode.

In an embodiment, the terminal, after the focus mode is confirmed to be entered, determines the interface content of the current focus mode interface. The terminal may determine the corresponding interface content according to the scenario as used. For example, in a driving scenario, the interface content may include vehicles, maps, and the like. The interface content may include at least one of an interface image, an interface text, and an interface color, and the interface content may be changed with different phases of the focus mode.

In an embodiment, the terminal determines a completion progress according to the duration of the focus mode and a time length that has been passed, and determines the interface content according to the completion progress. For example, the interface image, the interface text, and the interface color may be changed when the time length that has been passed comes to 30%, 60%, and 90% of the duration of the focus mode.

In an embodiment, the terminal acquires the number of times that the screen has been turned on during the focus mode, and display corresponding content according to the number of times that the screen has been turned on. When the number of times that the screen has been turned on reaches a threshold, the displayed content may include prompt information on the number of times that the screen has been turned on. For example, the threshold can be set as 5 in advance in the terminal, and each time the user turns on and turns off the screen, the number of times that the terminal has been turned on will be added by one. When the terminal detects that the screen has been turned on for 5 times, the user will be reminded on the focus mode interface that the screen has been turned on too frequently.

Figure 10:
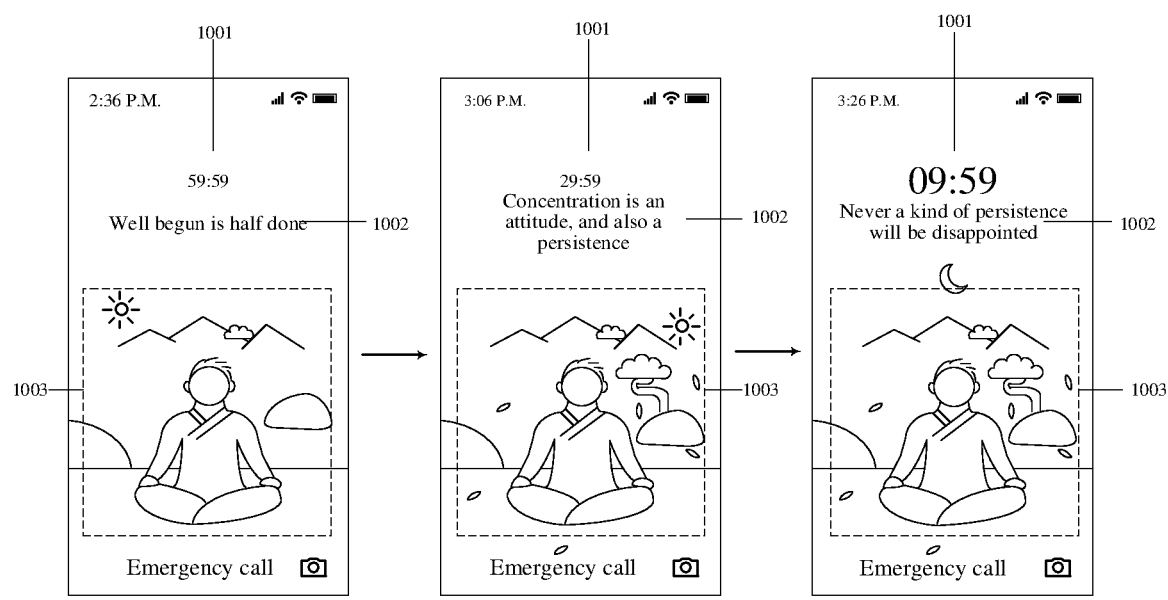
FIG. 10 is a schematic diagram illustrating changes in a focus mode interface according to an embodiment of the present disclosure.
Figure 11:
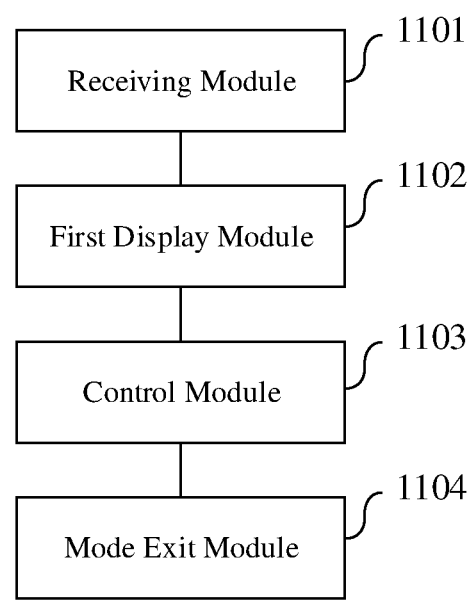
FIG. 11 is a block diagram of a terminal control apparatus according to an embodiment of the present disclosure.

FIG. 10 is a schematic diagram illustrating changes in a focus mode interface under different phases of the focus mode according to an embodiment. The duration of the focus mode in FIG. 10 is 60 minutes. When it has passed 30 minutes from the beginning of the focus mode, the focus mode interface displays the interface content on the left side of FIG. 10. When the time length is between 30 minutes to 50 minutes, the focus mode interface displays the interface content in the middle of FIG. 10. When the time length comes to 50 minutes, the focus mode interface displays the interface content on the right side of FIG. 10. In the three phases, a display time 1001, a display text 1002, a display color, and a display image 1003 are all changed. For example, the display time 1001 represents the remaining time of the focus mode, the display image 1003 changes from morning to evening and then to night, and the display color changes from white to yellow to purple, etc. The interface text 1002 at different stages will be changed along with the user's progress.

In step 906, when the screen is turned on, the focus mode interface is displayed based on the interface content.

In the terminal, when the focus mode is entered and the phase of the focus mode changes, the interface content of the focus mode interface is determined. When the terminal screen is turned on, the UI and the amination effect module are controlled to display the corresponding focus mode interface in the foreground.

In step 907, in response to an application-invoking request received within the duration of the focus mode, process control is performed on the application being invoked, wherein the process control is used to determine whether to execute the application being invoked in the foreground.

In step 908, when the duration of the focus mode ends, the focus mode is exited.

Steps 907 to 908 are similar to steps 103 and 104 (FIG. 1).

By detecting whether an application reminder exists within the duration of the focus mode, the user will be reminded of the application reminder and be asked to confirm whether to enter the focus mode, thereby preventing the user from missing important reminder information within the duration of the focus mode and affecting the user's normal schedule. In addition, the terminal displays corresponding contents according to different application scenarios and different phases of the focus mode, which takes the actual experience of the user into account and enhances the practicality of the focus mode.

FIG. 10 is a block diagram illustrating a terminal control apparatus according to an embodiment of the present disclosure. The apparatus can be implemented through software, or hardware, or a combination of both, for all or parts of a terminal. The apparatus includes: a receiving module 1001 configured to receive a focus mode starting instruction; a first display module 1002 configured to enter a focus mode according to the focus mode starting instruction; a control module 1003 configured to perform, in response to an application-invoking request received within a duration of the focus mode, process control on an application being invoked, wherein the process control is configured to determine whether to execute the application being invoked in a foreground; and a mode exit module 1004 configured to exit the focus mode when the duration of the focus mode ends.

In an embodiment, the first display module 1002 includes: a mode entry submodule configured to set a system state to a low response state and then enter the focus mode according to the focus mode starting instruction, and the mode exiting module 1004 includes: a state restoration submodule configured to restore the system state to an initial response state, and exit the focus mode, wherein functions responded to by a system in the low response state are less than functions responded to by the system in the initial response state.

In an embodiment, in the system being in the low response state, a response to at least one of the following functions is turned off: a click function for virtual buttons and/or physical buttons, a touch control function for auxiliary controls, a quick gesture function, and a voice control function.

In an embodiment, the control module 1003 includes: a first determination submodule configured to identify, in response to the application-invoking request as received, the application being invoked; a second determination submodule configured to identify, when the application being invoked is in an application whitelist, a function being invoked in the application being invoked; and an execution submodule configured to execute, when the function being invoked is in a function whitelist, the application being invoked in the foreground.

In an embodiment, the focus mode starting instruction includes an application scenario corresponding to the focus mode, and the apparatus further includes: a first determination module configured to determine a target application corresponding to the application scenario, the target application being an application installed in the terminal and allowed to be used in the focus mode; and a second determination module configured to display an application entry corresponding to the target application in a focus mode interface, the focus mode interface being an interface displayed within the duration of the focus mode when a screen is turned on.

In an embodiment, the target application includes a navigation application when the application scenario is a driving scenario; the target application includes a learning application when the application scenario is a learning scenario; and the target application includes a music application when the application scenario is a rest scenario.

In an embodiment, the apparatus further includes: a third determination module configured to determine interface content of a focus mode interface, wherein the interface content includes at least one of an interface image, an interface text and an interface color, and the interface content is different at different phases of the focus mode; and the first display module configured to display the focus mode interface based on the interface content when the screen is turned on.

In an embodiment, the third determination module includes: a third determination submodule configured to determine a completion progress according to the duration of the focus mode and a time length that has been passed; and a fourth determination submodule configured to determine the interface content according to the completion progress, or an acquisition submodule configured to acquire a number of times that the screen has been turned on during the focus mode; and a fifth determination submodule configured to determine the display content according to the number of times that the screen has been turned on, wherein when the number of times that the screen has been turned on reaches a threshold, the display content includes prompt information about the number of times that the screen has been turned on.

In an embodiment, the apparatus further includes: a fourth determination module configured to obtain a time frame of the focus mode according to a current time and the duration of the focus mode; and a second display module configured to display, in response to an application reminder of a preset application within the time frame of the focus mode, prompt information, and the first display module includes: a display submodule configured to enter, when no application reminder exists in any preset application within the time frame of the focus mode, the focus mode according to the focus mode starting instruction.

Figure 12:
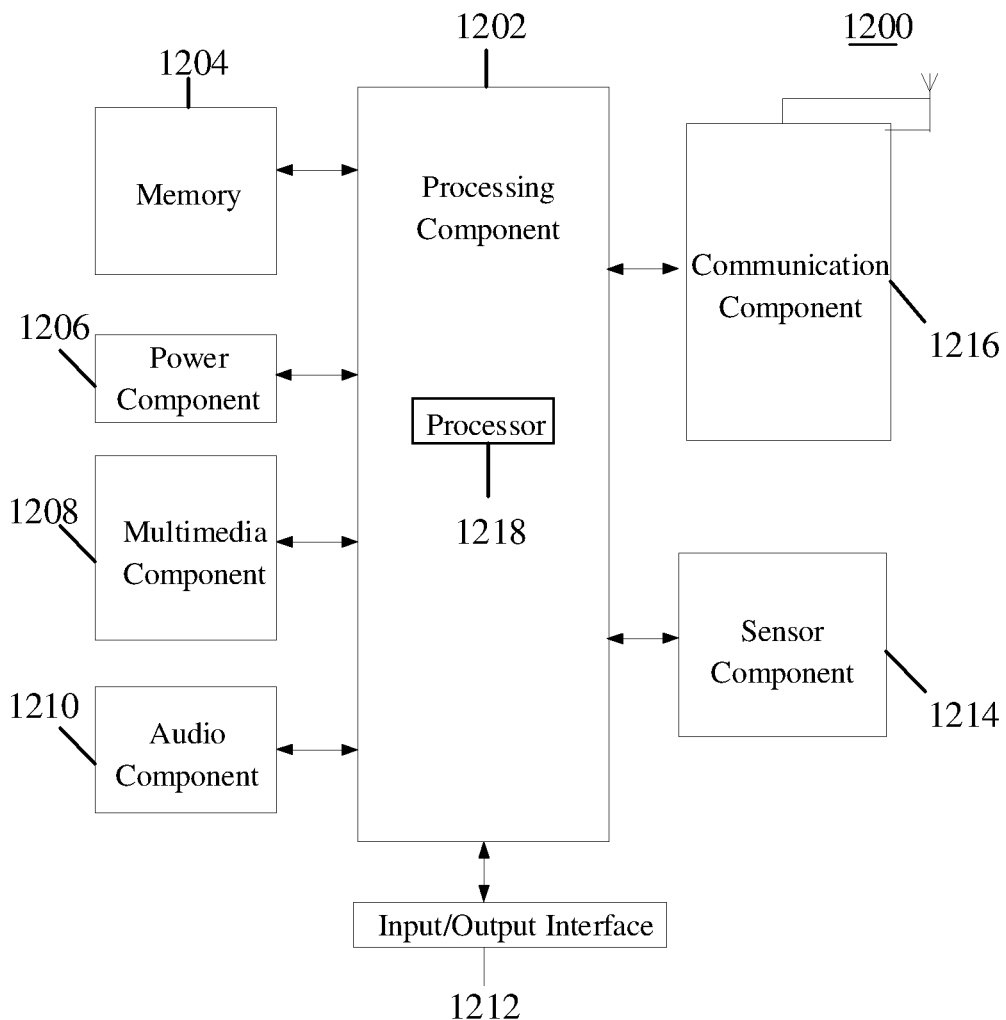
FIG. 12 is a block diagram of a terminal according to an embodiment of the present disclosure.

FIG. 12 is a block diagram of a terminal 1200 according to an embodiment of the present disclosure. The terminal 1200 may be implemented as a terminal-controlled device. The terminal 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the terminal 1200, such as the operations associated with display, telephone calls, data communications, camera operations, and recording operations. The processing component 1202 may include one or more processors 1218 to execute instructions. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the terminal 1200. Examples of such data include instructions for any applications or methods operated on the terminal 1200, contact data, phonebook data, messages, pictures, video, etc. The memory 1204 may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the terminal 1200. The power component 1206 may include a power management system, one or more power sources, and any other components associated with the generation, management, and distribution of power in the terminal 1200.

The multimedia component 1208 includes a screen providing an output interface between the terminal 1200 and the user. In some embodiments, the screen may include a liquid crystal display (LCD) and a touch panel (TP). When the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a time period and a pressure associated with the touch or slide action. In some embodiments, the multimedia component 1208 includes a front camera and/or a rear camera. The front camera and/or the rear camera may receive an external multimedia datum while the terminal 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the terminal 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide status assessments of various aspects of the terminal 1200. For instance, the sensor component 1214 may detect an open/closed status of the terminal 1200, the display and the keypad of the terminal 1200, a change in position of the terminal 1200 or a component of the terminal 1200, a presence or absence of user contact with the terminal 1200, an orientation or an acceleration/deceleration of the terminal 1200, and a change in temperature of the terminal 1200. The sensor component 1214 may include a proximity sensor configured to detect the presence of nearby objects without any physical contact. The sensor component 1214 may also include a light sensor, such as a complementary metal oxide semiconductor (CMOS) or charge-coupled device (CCD) image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wiredly or wirelessly, between the terminal 1200 and other devices. The terminal 1200 can access a wireless network based on a communication standard, such as wireless fidelity (WiFi), 2G, 3G, 4G or 5G, or a combination thereof. In one embodiment of the present disclosure, the communication component 1216 receives a broadcast signal or broadcast associated information from an external broadcast management system via a broadcast channel. In one embodiment of the present disclosure, the communication component 1216 further includes a near field communication (NFC) module to facilitate short-range communications.

In some embodiments, the terminal 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

In some embodiments, there is also provided a non-transitory computer readable storage medium including instructions, such as the memory 1204 including instructions. These instructions may be executed by the processor 1218 in the terminal 1200 to implement the terminal control method as provided in the above various embodiments. For example, the non-transitory computer-readable storage medium may be a ROM, a random access memory (RAM), a compact disc read-only memory (CD-ROM), a magnetic tape, a floppy disc, an optical data storage device, or the like.

Embodiments of the present disclosure further provide a computer-readable storage medium storing at least one instruction that, when executed by a processor of a device, causes the device to perform the terminal control method according to the above embodiments.

A person skilled in the art shall appreciate that in one or more examples described above, the functions described in the embodiments of the present disclosure can be implemented in hardware, software, firmware, or any combination thereof. When the functions are implemented in the software, they may be stored in a computer-readable medium or transmitted as one or more instructions or codes on a computer-readable medium.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The embodiments are exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A terminal control method, comprising:
receiving a focus mode starting instruction;
entering a focus mode according to the focus mode starting instruction;
performing, in response to an application-invoking request received within a duration of the focus mode, process control on an application being invoked, wherein the process control is configured to determine whether to execute the application being invoked in a foreground;
exiting the focus mode when the duration of the focus mode ends; and
displaying a focus mode sharing page, wherein the focus mode sharing page comprises at least one of a start time and end time of the focus mode, the duration of the focus mode, a number of times that a screen is turned on within the duration of the focus mode, a total accumulative duration of all historical focus modes, or a comment.

2. The method according to claim 1, wherein the entering the focus mode according to the focus mode starting instruction comprises:
according to the focus mode starting instruction, setting a system state to a low response state and entering the focus mode, and
the exiting the focus mode comprises:
restoring the system state to an initial response state and exiting the focus mode, wherein functions responded to in the low response state are less than functions responded to in the initial response state.

3. The method according to claim 2, wherein in the low response state, a response to at least one of the following functions is turned off: a click function for at least one of a virtual button or a physical button, a touch control function for auxiliary controls, a quick gesture function, and a voice control function.

4. The method according to claim 1, wherein the performing, in response to the application-invoking request received within a duration of the focus mode, the process control on the application being invoked comprises:
identifying, in response to the application-invoking request, the application being invoked;
identifying, when the application being invoked is in an application whitelist, a function being invoked in the application being invoked; and
executing, when the function being invoked is in a function whitelist, the application being invoked in the foreground.

5. The method according to claim 1, wherein the focus mode starting instruction comprises an application scenario corresponding to the focus mode; and after entering the focus mode according to the focus mode starting instruction, the method further comprises:
determining a target application corresponding to the application scenario, the target application being an application installed in a terminal and allowed to be used in the focus mode; and
displaying an application entry corresponding to the target application in a focus mode interface, the focus mode interface being an interface displayed within the duration of the focus mode when the screen is turned on.

6. The method according to claim 5, wherein:
the target application includes a navigation application when the application scenario is a driving scenario;
the target application includes a learning application when the application scenario is a learning scenario; and
the target application includes a music application when the application scenario is a rest scenario.

7. The method according to claim 1, wherein after entering the focus mode according to the focus mode starting instruction, the method further comprises:
determining interface content of a focus mode interface, wherein the interface content comprises at least one of an interface image, an interface text and an interface color, and the interface content is different at different phases of the focus mode; and
displaying the focus mode interface based on the interface content when the screen is turned on.

8. The method according to claim 7, wherein the determining the interface content of the focus mode interface comprises one of:
determining a completion progress according to the duration of the focus mode and a time length that has been passed; and determining the interface content according to the completion progress; or
acquiring a number of times that the screen has been turned on during the focus mode; and determining display content according to the number of times that the screen has been turned on, wherein when the number of times that the screen has been turned on reaches a threshold, the display content comprises prompt information about the number of times that the screen has been turned on.

9. The method according to claim 1, wherein after receiving the focus mode starting instruction, the method further comprises:
obtaining a time frame of the focus mode according to a current time and the duration of the focus mode; and
displaying, in response to detecting an application reminder of a preset application within the time frame of the focus mode, prompt information, and
the entering the focus mode according to the focus mode starting instruction comprises:
entering, when no application reminder exists in any preset application within the time frame of the focus mode, the focus mode according to the focus mode starting instruction.

10. An apparatus, comprising:
a processor;
a memory configured to store instructions executable by the processor,
wherein the processor is configured to:
receive a focus mode starting instruction;
enter a focus mode according to the focus mode starting instruction;
perform, in response to an application-invoking request received within a duration of the focus mode, process control on an application being invoked, wherein the process control is configured to determine whether to execute the application being invoked in a foreground;

exit the focus mode when the duration of the focus mode ends; and display a focus mode sharing page, wherein the focus mode sharing page comprises at least one of a start time and end time of the focus mode, the duration of the focus mode, a number of times that a screen is turned on within the duration of the focus mode, a total accumulative duration of all historical focus modes, or a comment.

11. The apparatus according to claim 10, wherein the processor is further configured to:

set a system state to a low response state and enter the focus mode according to the focus mode starting instruction, and restore the system state to an initial response state and exit the focus mode, wherein functions responded to in the low response state are less than functions responded to in the initial response state.

12. The apparatus according to claim 11, wherein in the low response state, a response to at least one of the following functions is turned off: a click function for at least one of a virtual button or a physical button, a touch control function for auxiliary controls, a quick gesture function, and a voice control function.

13. The apparatus according to claim 10, wherein the processor is further configured to:

identify, in response to the application-invoking request, the application being invoked;

identify, when the application being invoked is in an application whitelist, a function being invoked in the application being invoked; and execute, when the function being invoked is in a function whitelist, the application being invoked in the foreground.

14. The apparatus according to claim 10, wherein the focus mode starting instruction comprises an application scenario corresponding to the focus mode, and the processor is further configured to:

determine a target application corresponding to the application scenario, the target application being an application installed in a terminal and allowed to be used in the focus mode; and display an application entry corresponding to the target application in a focus mode interface, the focus mode interface being an interface displayed within the duration of the focus mode when the screen is turned on.

15. The apparatus according to claim 14, wherein the target application includes a navigation application when the application scenario is a driving scenario;

the target application includes a learning application when the application scenario is a learning scenario; and the target application includes a music application when the application scenario is a rest scenario.

16. The apparatus according to claim 10, wherein the processor is further configured to:

determine interface content of a focus mode interface, wherein the interface content comprises at least one of an interface image, an interface text and an interface color, and the interface content is different at different phases of the focus mode; and display the focus mode interface based on the interface content when the screen is turned on.

17. The apparatus according to claim 16, wherein the processor is further configured to:

determine a completion progress according to the duration of the focus mode and a time length that has been passed; and determine the interface content according to the completion progress.

18. The apparatus according to claim 16, wherein the processor is further configured to:

acquire a number of times that the screen has been turned on during the focus mode; and determine display content according to the number of times that the screen has been turned on, wherein when the number of times that the screen has been turned on reaches a threshold, the display content comprises prompt information about the number of times that the screen has been turned on.

19. The apparatus according to claim 10, wherein the processor is further configured to:

obtain a time frame of the focus mode according to a current time and the duration of the focus mode;

display, in response to an application reminder of a preset application within the time frame of the focus mode, prompt information, and enter, when no application reminder exists in any preset application within the time frame of the focus mode, the focus mode according to the focus mode starting instruction.

20. A non-transitory computer-readable storage medium having stored therein instructions that, when executed by a processor in a terminal, cause the terminal to perform a terminal control method, the method comprising:

receiving a focus mode starting instruction;

entering a focus mode according to the focus mode starting instruction;

performing, in response to an application-invoking request received within a duration of the focus mode, process control on an application being invoked, wherein the process control is configured to determine whether to execute the application being invoked in a foreground;

exiting the focus mode when the duration of the focus mode ends; and displaying a focus mode sharing page, wherein the focus mode sharing page comprises at least one of a start time and end time of the focus mode, the duration of the focus mode, a number of times that a screen is turned on within the duration of the focus mode, a total accumulative duration of all historical focus modes, or a comment.

* * * * *